United States Patent [19]

Berner

[11] Patent Number: 4,860,144

[45] Date of Patent: Aug. 22, 1989

[54] OVERLOAD PROTECTOR FOR A ROBOT ARM

[75] Inventor: Klaus Berner, Reilingen, Fed. Rep. of Germany

[73] Assignee: Siemens Aktiengesellschaft, Berlin and Munich, Fed. Rep. of Germany

[21] Appl. No.: 130,714

[22] Filed: Dec. 9, 1987

[30] Foreign Application Priority Data

Dec. 9, 1986 [DE] Fed. Rep. of Germany ....... 3641920

[51] Int. Cl.⁴ .............................................. B25J 13/08
[52] U.S. Cl. ....................................... 361/1; 361/179; 307/119; 200/47; 200/341; 318/626; 318/469; 901/13

[58] Field of Search .......................... 361/179, 180, 1; 307/119, 116, 326; 200/47, 340; 414/5, 4, 744 R; 901/11–13, 9, 28; 403/84, 86; 318/626, 568, 469

[56] References Cited

U.S. PATENT DOCUMENTS 2,523,125  9/1950  Ley ................................ 200/340 X

FOREIGN PATENT DOCUMENTS 3241132  5/1984  Fed. Rep. of Germany .

*Primary Examiner*—Todd E. Deboer
*Attorney, Agent, or Firm*—Mark H. Jay

[57] ABSTRACT

An overload protector for a robot arm has an open-topped cylinder into which a piston is inserted. The piston is held against a circumferential stop surface of the cylinder by compression springs.

3 Claims, 2 Drawing Sheets

OVERLOAD PROTECTOR FOR A ROBOT ARM

BACKGROUND OF THE INVENTION

The invention relates to robots. More particularly, the invention relates to an overload protector for the attachment of a tool to a robot arm, in which the protector protects the robot arm against overload by pressure forces and tilting moments.

A device of this type is shown in German Offenlegungsschrift DE-OS No. 32 41 132. In this, the two elements are rigidly connected to the robot arm and the tool (or the tool holder) respectively. An axial compression spring is engaged between the two coupler elements, which are held together by retaining bolts. When the tool is subjected to forces which exceed those exerted by the pre-stressed spring, one side of the spring is compressed. This causes the tool axis to buckle relative to the axis of the robot arm. A detector element fastened to one element is then separated from an inductive proximity switch which is mounted in the other element. This produces a cut-off signal for the robot control system. The holding bolts engage co-axial holes in the other element and are tiltable with respect to it. At least one of the holding bolts has an enlarged spherical head which is tightly engaged in the corresponding hole in such a manner that there is no play between the head and the element and the head cannot rotate.

SUMMARY OF THE INVENTION

One object of the invention is to provide a compact, simple and inexpensive overload protector for a robot arm.

Another object is, in general, to improve on known devices of this type.

In accordance with the invention, an overload protector for a robot arm has two elements. One of these is shaped as an open-topped cylinder and the other is shaped as a piston which is fitted within the cylinder. The cylinder has a stop surface for the piston, and the piston has a radially extending projection which extends through an axially extending guide slot located in the cylinder.

The stop surface may advantageously be a circumferential bead against which the piston rests. The two elements are directly engaged with each other. Holding bolts may therefore be eliminated and the construction of the protector considerably simplified. The piston may advantageously be very flat, reducing the height and the weight of the unit. The radial projection may, for example, be a cylindrical pin which is secured to the piston. The guide slot width can be easily and accurately matched to the diameter of the pin. This prevents the cylinder and piston from rotating with respect to each other. Since the peripheral surface of the piston is short in the axial direction the piston does not bind with the cylinder even at large excursions. Expanded compression springs can advantageously be mounted between the cylinder bottom and the piston to insure a positive return of the piston after it has been extended. Since the stopping surface of the cylinder forms a single striking surface for the piston, the normal relative positions of two elements may be conveniently set with a high degree of accuracy.

° In preferred embodiments, the peripheral surface of the piston is short and rounded. This permits the piston and cylinder to remain accurately mated even at large extension angles.

Advantageously, a detector unit and position sensor are mounted to the cylinder and an adjustable stop is mounted to the piston to cooperate with the detector unit. This permits an adjustment of the maximum permissible excursion of the piston. Further advantageously, the stop has a surface which is stepped in the radial direction, and the detector is actuated when the step moves past it. This allows the unit to be relatively flat. If, as is preferred, the position sensor is an inductive proximity switch, adjustability of the detector unit is facilitated.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

Figure 1:
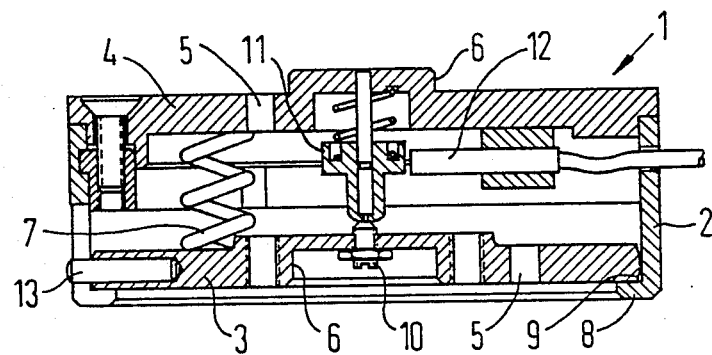
FIG. 1 is a schematic, cross-sectional view of a preferred embodiment of the invention.
Figure 2:
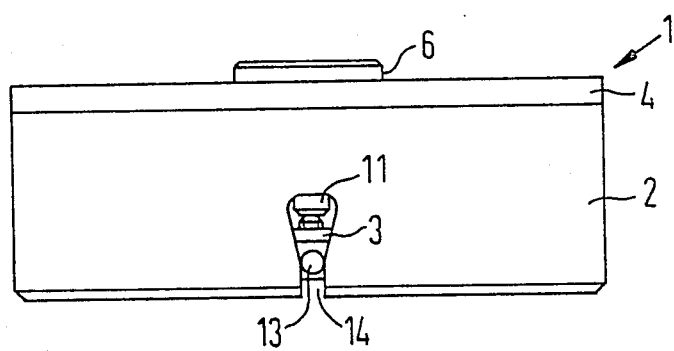
FIG. 2 is a side view of the preferred embodiment.
Figure 3:
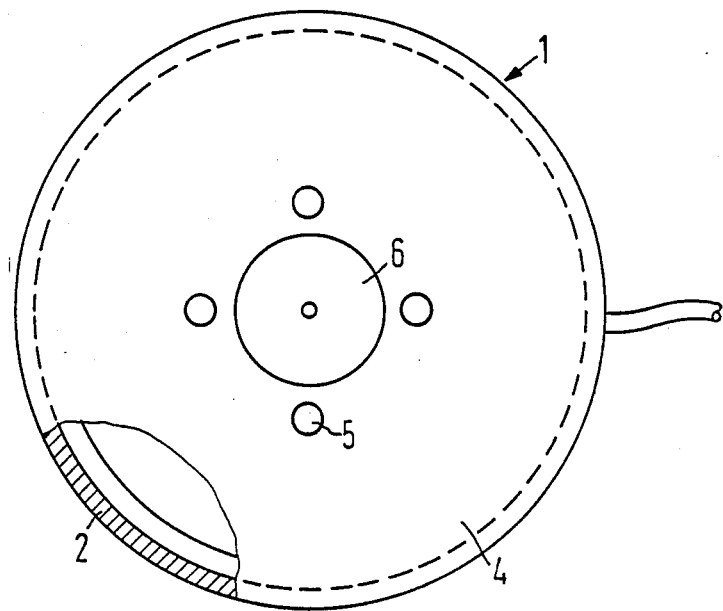
FIG. 3 is a top view of the preferred embodiment.

An overload protector generally indicated by reference numeral 1 has an open-topped cylinder 2 and a short piston 3. The piston 3 protrudes into the cylinder 2, and is closely fitted (i.e. with no play) within it. The piston 3 and bottom 4 of the cylinder 2 are provided with attachment holes 5 and centering projections 6 for, respectively, the tool (not shown) and robot arm (not shown). Located between the bottom 4 and the piston 3 are compression springs 7, which press the piston 3 against an inwardly projecting circumferential stop surface 8 of the cylinder 2.

The piston 3 has a peripheral surface 9 which is semicircular in cross-section. This prevents excessive play when the cylinder 2 and piston 3 are tilted relative to each other. An adjustable stop screw 10 is provided in the piston 3 for a detector unit 11. The detector unit 11 is axially movable on the cylinder 2 and is spring-loaded against the stop screw 10. The spherical tip of the stop screw 10 protrudes minimally out of the piston so that the tip strikes the detector unit 11 close to the midpoint of the piston 3. The detector unit 11 has a peripheral surface which is stepped in the radial direction. An inductive proximity switch 12 is pointed toward the detector unit 11. Should the piston 3 become tilted relative to the cylinder 2, the detector unit 11 moves towards the bottom 4 of the cylinder 2. As the step of the detector unit moves past the proximity switch 12, the electrical state of the switch 12 is altered. This provides an indication to the robot controller (not shown) that the pre-set tilting angle has been exceeded.

A cylindrical pin 13 extends radially into the cylinder 3, and protrudes, without play, into an axially extending guide slot 14 in the outer wall of the cylinder 2. The cylindrical pin 13 prevents rotation of the cylinder 2 and piston 3 relative to each other, without affecting tilting movement between them.

Those skilled in the art will understand that changes can be made in the preferred embodiments here described, and that these embodiments can be used for other purposes. Such changes and uses are within the scope of the invention, which is limited only by the claims which follow.

What is claimed is:

1. An overload protector for robot arms, comprising:

a piston having a rounded circumferential surface which is semi-circular in cross-section;

an open-topped cylinder receiving the piston, the cylinder having a radially inwardly extending stop surface against which the piston bears when fully inserted into the cylinder and also having a straight axially-extending slot;

a radially-extending pin with a proximal end secured to the piston and extending out of the cylinder through the slot;

means for attaching a tool to the piston; and means for attaching a robot arm to the cylinder.

2. An overload protector for robot arms, comprising:

a piston;

an open-topped cylinder receiving the piston, the cylinder having a radially inwardly extending stop surface against which the piston bears when fully inserted into the cylinder and also having a straight axially-extending slot;

a position sensor mounted to the cylinder and being responsive to radial proximity of a metal body;

a metal detector unit mounted to the cylinder in proximate relationship with the position sensor in such a manner as to cause a change in state of the position sensor when moved with respect thereto, the detector uiit having an exterior surface which is stepped in the radial direction, whereby axial motion of the detector unit causes a change of state of the position sensor;

adjustable stop means for transmitting motion of the piston to the detector unit, said stop means being adjustable to vary the spacing between the piston and the detector unit;

a radially-extending pin with a proximal end secured to the piston and extending out of the cylinder through the slot;

means for attaching a tool to the piston; and means for attaching a robot arm to the cylinder.

3. The protector of claim 2 wherein the position sensor is an inductive proximity switch.

* * * * *